US012771192B2

(12) United States Patent
Kondo et al.

(10) Patent No.: US 12,771,192 B2
(45) Date of Patent: Oct. 20, 2026

(54) CONCAVE MAGNET FOR ROTOR OF ELECTRIC MOTOR

(71) Applicant: DENSO CORPORATION, Kariya-city (JP)

(72) Inventors: Keiji Kondo, Kariya-city (JP); Hiroshi Endo, Kariya-city (JP); Akira Ozeki, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 189 days.

(21) Appl. No.: 18/677,243

(22) Filed: May 29, 2024

(65) Prior Publication Data

US 2024/0405620 A1 Dec. 5, 2024

(30) Foreign Application Priority Data

May 31, 2023 (JP) ................................ 2023-089659

(51) Int. Cl.
*H02K 1/276* (2022.01)

(52) U.S. Cl.
CPC .................................. *H02K 1/276* (2013.01)

(58) Field of Classification Search
CPC ............. H02K 21/227; H02K 2201/12; H02K 2203/09; H02K 3/525
See application file for complete search history.

(56) References Cited

U.S. PATENT DOCUMENTS

| | | | | |
|---|---|---|---|---|
| 8,084,910 | B2 * | 12/2011 | Silander | H02K 1/276 310/156.31 |
| 2005/0275302 | A1 * | 12/2005 | Rahman | H02K 1/2766 310/156.56 |
| 2008/0224558 | A1 * | 9/2008 | Ionel | H02K 1/2766 310/156.57 |
| 2010/0219712 | A1 | 9/2010 | Kogure et al. | |
| 2013/0113328 | A1 | 5/2013 | Kogure et al. | |
| 2015/0137646 | A1 | 5/2015 | Tsuchida et al. | |
| 2020/0119604 | A1 | 4/2020 | Jourdan | |
| 2020/0212737 | A1 | 7/2020 | Inoue | |

FOREIGN PATENT DOCUMENTS

| | | | |
|---|---|---|---|
| CN | 106059145 | A | 10/2016 |
| JP | 2004-289905 | A | 10/2004 |
| JP | 5852345 | B2 | 2/2016 |
| JP | 2017-158282 | A | 9/2017 |

* cited by examiner

*Primary Examiner* — Tulsidas C Patel
*Assistant Examiner* — Mohammed Ahmed Qureshi
(74) *Attorney, Agent, or Firm* — Precision Patents, P.C.

(57) ABSTRACT

A rotor having a magnet-embedded structure includes a rotor core and a permanent magnet held in the rotor core. A permanent magnet is accommodated in an accommodation hole provided in the rotor core. The permanent magnet has a first surface and a second surface which extend in a direction intersecting with the magnetization direction, which is a direction of magnetic field lines inside the magnet and opposes each other. At least one of the first surface and the second surface is provided with a concave portion, which is provided with a curved surface in a concaved shape at a middle portion between both ends in a longitudinal cross-section.

14 Claims, 8 Drawing Sheets

CONCAVE MAGNET FOR ROTOR OF ELECTRIC MOTOR

CROSS REFERENCE TO RELATED APPLICATIONS

The present application is based on and claims the benefit of priority from Japanese Patent Application No. 2023-89659 filed in Japan filed on May 31, 2023, the entire disclosure of the above application is incorporated herein by reference.

TECHNICAL FIELD

The present invention relates to a rotor used in a rotary electric machine.

BACKGROUND

Some rotor for a rotary electric machine includes at least one permanent magnet to define appropriate magnetic characteristics in the rotor. In one aspect, there may be a risk that the permanent magnet may be damaged due to a stress concentration. In another aspect, there may be a risk that the permanent magnet may be demagnetized. In the above aspects, or in other aspects not mentioned, there is a need for further improvements in a rotor for a rotary electric machine.

SUMMARY

In the first solution, a rotor having a magnet-embedded structure having a rotor core and a magnet held in the rotor core, the magnet being accommodated in an accommodation hole provided in the rotor core, wherein the magnet has a first surface and a second surface which extend in a direction intersecting with a magnetization direction, which is a direction of magnetic field lines inside the magnet, and opposes each other, and wherein at least one of the first surface and the second surface is provided with a concave portion, which is provided with a curved surface in a concaved shape at a middle portion between both ends in a longitudinal cross-section.

It is an employed structure in which a concave portion is formed by depressing a middle portion between both ends in the longitudinal cross-section on at least one of the first surface and the second surface extending in a direction intersecting with the magnetization direction inside the magnet in the magnet of the rotor having the magnet-embedded structure. In this case, a thicknesses at both ends of the permanent magnet in the magnetization direction are thicker than that of a middle portion therebetween. Thereby, it is possible to improve a strength of an anti-demagnetization performance against a reversal magnetic field of a winding applied from a side of the stator to end portions of the magnet in the rotor. In particular, since the concave portion is formed a curved surface in a concaved shape, it is possible to suppress stress concentration in the concave portion of the magnet even if the magnet is subjected to assembling stress or usage environmental stress due to vibrations, hot and cold thermal change etc. As a result, it is possible to improve the anti-demagnetization performance of the magnets and suppress damage to the magnets.

In the second solution, the magnet has a magnet specific surface which is a surface among the first surface and the second surface where the concave portion is formed, the rotor core has a core specific surface which is an inner surface facing the magnet specific surface among an inner surface defining the accommodation hole, and the core specific surface has a convex portion which is received in the concave portion on the magnet specific surface.

It is an employed structure in which the concave portion is provided on the magnet specific surface of the magnet, and the convex portion, which is received in the concave portion of the magnet specific surface, is provided on the core specific surface of the rotor core. In this case, it is possible to suppress a positional displacement of the magnet within the accommodation hole by an engagement between the concave portion of the magnet specific surface and the convex portion of the core specific surface.

In the third solution, distances between the magnet specific surface and the core specific surface are formed so that the distance at a portion where the concave portion is provided on the magnet specific surface is different from the distance at a portion where the concave portion is not provided.

The distances between the magnet specific surface and the core specific surface are made to be different between that at a portion where the concave portion is formed on the magnet specific surface and that at a portion where the concave portion is not formed. As a result, it is possible to partially provide a wide gap between the magnet accommodated in the accommodation hole of the rotor core and the inner surface of the accommodation hole, then it is possible to reduce insertion load due to contact friction at an inserting process of the magnet and suppress damage of the magnet due to contact.

In the fourth solution, distances between the magnet specific surface and the core specific surface are formed so that the distance at a portion where the concave portion is provided on the magnet specific surface is smaller than the distance at a portion where the concave portion is not provided.

The distance between the magnet specific surface and the core specific surface at a portion where the concave portion is provided on the magnet specific surface is made relatively small. Thereby, it is possible to perform a suppression of the positional displacement of the magnet appropriately by using the concavity and convexity engagement. Further, the distance between the magnet specific surface and the core specific surface at a portion where the concave portion is not provided on the magnet specific surface is made relatively large. As a result, it is possible to suppress damage to the magnet due to both ends of the magnet coming in contact with the inner surface on a side of the rotor core, and also it is possible to improve an effect of suppressing demagnetization of the magnet by reducing the magnetic field of the winding applied to the ends of the magnet.

In the fifth solution, one of the portion where the concave portion is provided on the magnet specific surface and the portion where the concave portion is not provided is in contact with the core specific surface.

It makes possible to appropriately perform a fixing of the magnet within the accommodation hole by partially providing a contact portion with the inner surface of the accommodation hole on the magnet specific surface, and it is possible to reduce load in an inserting process of the magnet and it is possible to perform suppression of damage to the magnet due to excessive press-fitting stress by reducing a contact surface area in an inserting process of the magnet into the accommodation hole.

In the sixth solution, portions where the concave portion is provided on the magnet specific surface is in contact with the core specific surface among portions where the concave portion is provided on the magnet specific surface and portions where the concave portion is not provided.

It is possible to perform a suppression of the positional displacement of the magnet appropriately by using the concavity and convexity engagement by being in contact with the magnet specific surface on the core specific surface on a portion where the concave portion is provided on the magnet specific surface. In addition, it is possible to suppress damage to the magnet due to the both ends of the magnet coming in contact with the inner surface on a side of the rotor core and it is possible to improve an effect of suppressing demagnetization of the magnet by reducing the magnetic field of the winding applied to the ends of the magnet by making distances between the magnet specific surface and the core specific surface relatively large in portions where concave portion is not provided on the magnet specific surface.

In the seventh solution, a relationship between a curvature radius “A” of the concave portion on a magnet specific surface and a curvature radius “B” of the convex portion on a core specific surface is “A<B”.

It is possible to make the magnet being in contact with the core specific surface at two points on the magnet specific surface by making the curvature radius “A” of the concave portion on the magnet specific surface smaller than the curvature radius “B” of the convex portion on the core specific surface (A<B). Thereby, it is possible to reduce a contact area of the magnet with the inner surface on a side of the rotor core and suppress the magnet from unintentionally tilting within the accommodation hole.

In the eighth solution, a relationship between a curvature radius “A” of the concave portion on a magnet specific surface and a curvature radius “B” of the convex portion on a core specific surface is “A>B”.

It is possible to improve advantage for suppressing damage of the magnet, since enlarging of the concave portion of the magnet by the convex portion of the rotor core is suppressed even if the rotor core expands or the magnet contracts in a width direction of the magnet due to hot and cold thermal stress, by making a curvature radius “A” of the concave portion on a magnet specific surface larger than a curvature radius “B” of the convex portion on a core specific surface (i.e., to satisfy “A>B”).

In the ninth solution, the magnet includes pieces arranged on both sides of a d-axis, which is a magnetic pole center in the rotor core, respectively, and is placed in an orientation in which one end side of the first surface and the second surface is placed on a side of the d-axis and the other end side is placed on a side of a q-axis in a view of a longitudinal cross-section, and wherein the magnet specific surface of the magnet has a first flat portion on a side of the d-axis and a second flat portion on a side of the q-axis among both sides with respect to the concave portion, and wherein the second flat portion is wider than the first flat portion in the width direction in which the concave portion and both flat portions are arranged.

In a configuration in which magnets are provided on both sides of the d-axis in the rotor core, one end side of the first surface and the second surface of the magnet is on a side of the d-axis and the other end is on a side of a q-axis on a view in a longitudinal cross-section. In this case, the end of the magnet on a side of the q-axis is closer to the stator than the end on a side of the d-axis, a risk of demagnetization may be increased. In view of this point, in the magnet specific surface of the magnet, the second flat portion on a side of the q-axis is made wider than the first flat portion on a side of the d-axis, among both sides with respect to the concave portion. Thereby, it is possible to suitably suppress demagnetization due to magnetic field of the winding on a side of the stator.

In the tenth solution, the accommodation hole of the rotor core includes gaps which are provided on outside of both ends of the magnet in a longitudinal cross-section, and wherein the gaps are provided with no positioning step which comes in contact with an end surface between the first surface and the second surface of the magnet.

In a configuration in which the concave portion on a side of the magnet and the convex portion on a side of the rotor core are engageable at a middle portion in the width direction of the magnet, since a positional displacement of the magnet is suppressed by this engagement, as a result, no positioning using the ends in the width direction of the magnet is required. In view of this, it is an employed structure in which no positioning step, which comes in contact with an end surface (end surface in the width direction) between the first surface and the second surface of the magnet, is provided in gaps, which are provided on outside of both ends of the magnet in the longitudinal cross-section, in the accommodation hole of the rotor core. Thereby, it is possible to suppress short-circuiting of magnetic flux of the magnet caused by a positioning step that comes into contact with the end surface of the magnet in the width direction, and as a result, it is possible to improve torque output.

BRIEF DESCRIPTION OF DRAWINGS

The disclosure is further described with reference to the accompanying drawings in which.

DETAILED DESCRIPTION

Figure 1:
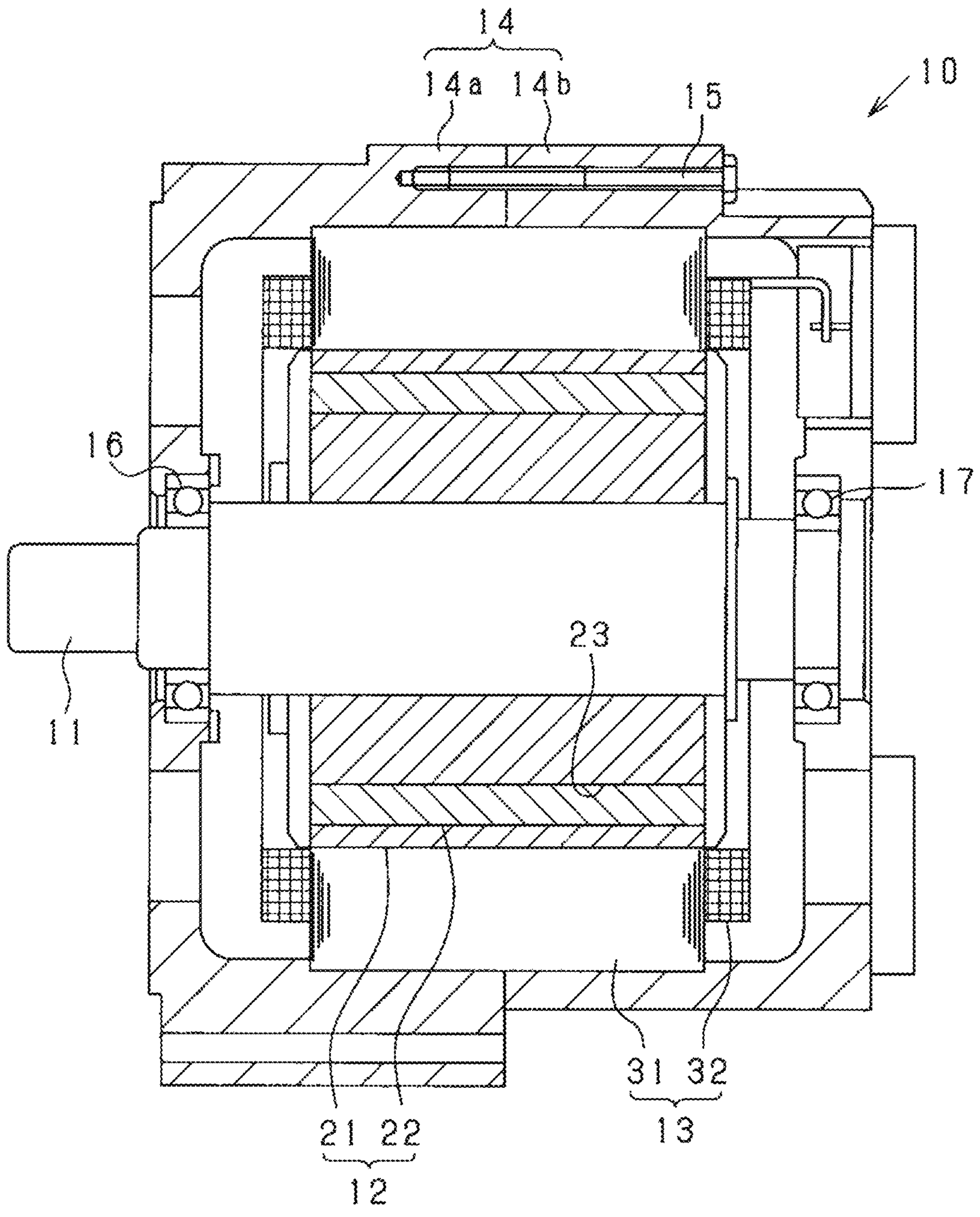
FIG. 1 is a vertical cross-sectional view of a rotary electric machine.

It is known that a technology described in JP2008-283823A as a prior art related to a rotor having a magnet-embedded structure, for example. In this prior art, in the cross section of the permanent magnet, both ends in a direction perpendicular to the magnetization direction are shaped to be thicker in the magnetization direction than a center portion, and this configuration improves an anti-demagnetization performance of the permanent magnet.

However, in the technique described in JP2008-283823A, both ends of the permanent magnet in the direction orthogonal to the magnetization direction are made thicker than a center portion, and a concave portion having a rectangular shape is formed in the center portion of the permanent magnet. Therefore, there may be a risk that the permanent magnet may be damaged due to a stress concentration caused by discontinuous shape change at a corner portion of the concave portion having the rectangular shape of the permanent magnet. For example, there may be a risk that the permanent magnet may be damaged due to a stress concentration caused by, e.g., an assembling stress created by enlarging the concave portion by a convex portion on a side of the core inserted into the concave portion of the permanent magnet within the accommodation hole of the rotor core, and a usage environmental stress created on the concave portion by vibrations, hot and cold thermal change etc.

Note that JP2008-283823A describes a configuration in which a permanent magnet is divided into both ends and a central portion in a direction orthogonal to the magnetization direction of the permanent magnet, this configuration does not cause damage due to stress concentration, it is concerned that a manufacturing cost may be increased.

It is an object of the present invention, which has been made in view of the above problems, to provide a rotor capable of improving an anti-demagnetization performance of magnets and suppress damage to the magnets.

Hereinafter, the means for solving the above-described problems and the operation and effects thereof are described.

An embodiment is described below with reference to the drawings. The rotary electric machine in the present embodiment is used, for example, as a vehicle-mounted electric device. However, the rotary electric machine may be widely used for industrial purposes, ships, aircraft, home appliances, OA equipment, game machines, and the like. In the following embodiments, the same or equivalent parts are denoted by the same reference numbers in the drawings, and explanation thereof in detail is omitted.

Figure 2:
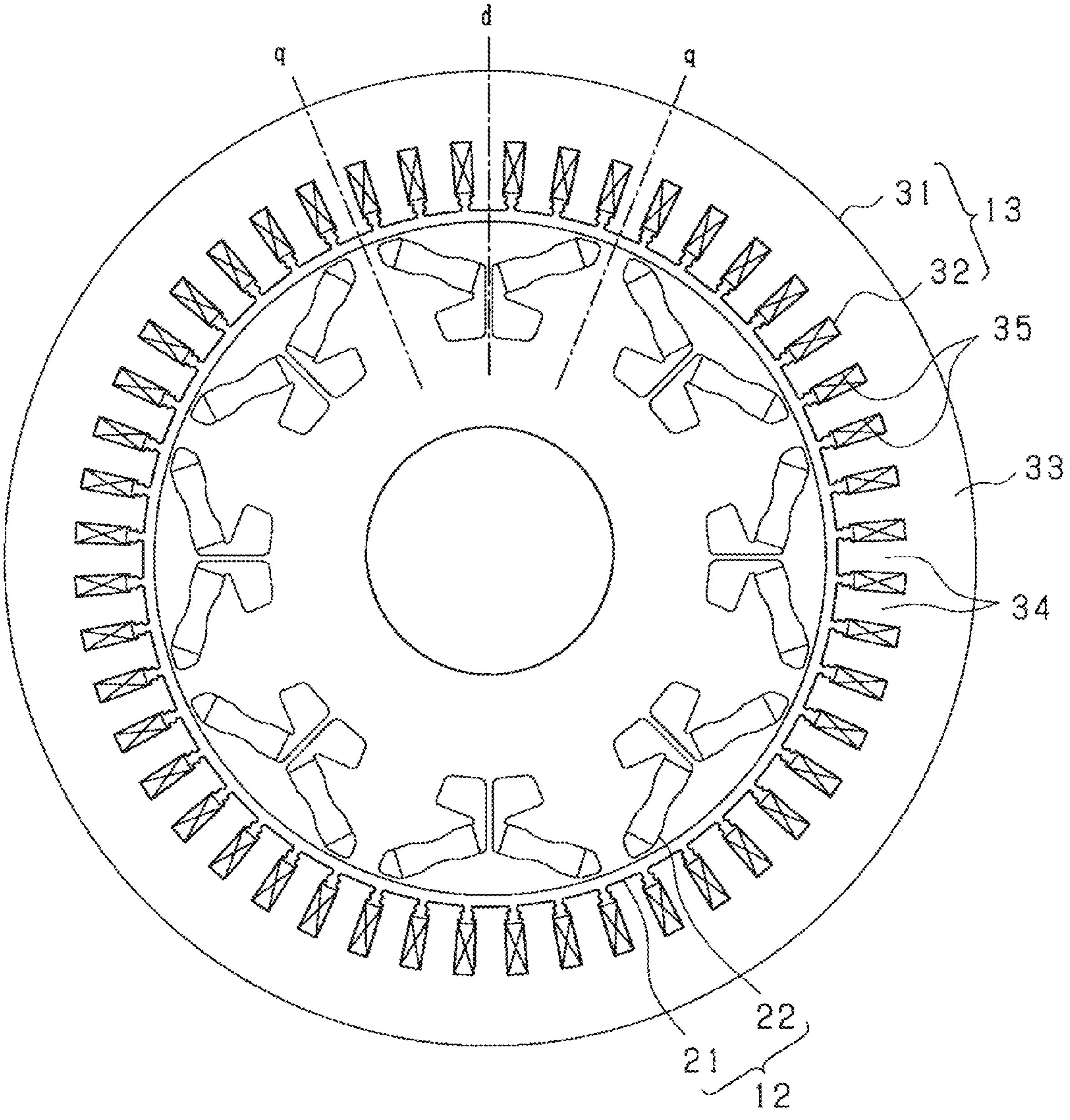
FIG. 2 is a longitudinal cross-sectional view showing a rotor and a stator.

The rotary electric machine 10 according to the present embodiment is an inner rotor type (internal rotation type) multiphase AC motor, and its outline is shown in FIG. 1 and FIG. 2. FIG. 1 is a vertical cross-sectional view of the rotary electric machine 10 in a direction along a rotatable shaft 11, and FIG. 2 is a cross-sectional view of a rotor 12 and a stator 13 in a direction perpendicular to the rotatable shaft 11. In the following description, a direction in which the rotatable shaft 11 extends is referred to as an axial direction, a direction extending radially around the rotatable shaft 11 is referred to as a radial direction, and a direction extending circumferentially around the rotatable shaft 11 is referred to as a circumferential direction.

The rotary electric machine 10 includes the rotor 12 fixed to the rotatable shaft 11, a stator 13 provided at a position surrounding the rotor 12, and a housing 14 that accommodates the rotor 12 and the stator 13. The rotor 12 and the stator 13 are arranged coaxially, and a predetermined air gap is formed between the outer peripheral surface of the rotor 12 and the inner peripheral surface of the stator 13. The housing 14 has a pair of bottomed cylindrical housing members 14*a* and 14*b*, and the housing members 14*a* and 14*b* are joined together at their openings and are joined by fastening bolts 15. The housing 14 is provided with bearings 16 and 17, and the rotatable shaft 11 and the rotor 12 are supported by the bearings 16 and 17 in a rotatable manner.

The rotor 12 is configured as a rotor having a magnet-embedded structure (IPM rotor) and includes a rotor core 21 that rotates integrally with a rotatable shaft 11, and a plurality of permanent magnets 22 held by the rotor core 21. The rotor core 21 is made of a soft magnetic material and is constructed by laminating a plurality of electromagnetic steel plates in the axial direction and fixing them by crimping or the like. A plurality of accommodation holes 23, which extends in the axial direction, are provided in the rotor core 21 at predetermined intervals in the circumferential direction, and each of the permanent magnets 22 is accommodated in each of the accommodation holes 23. Thereby, the permanent magnets 22 are arranged in the circumferential direction for each magnetic pole. In the present embodiment, the rotor 12 is provided with eight magnetic poles such that N poles and S poles are arranged alternately in the circumferential direction. However, the number of poles is arbitrary.

The stator 13 includes a stator core 31 having an annular shape, and a stator winding 32 wound around the stator core 31 having a multiphase (for example, three phases including a U-phase, a V-phase, and a W-phase). The stator core 31 is constructed by laminating a plurality of annular electromagnetic steel plates in the axial direction and fixing them by crimping or the like. The stator core 32 includes a yoke 33 in an annular shape and a plurality of teeth 34 that protrude radially inward from the yoke 33 and are arranged at a predetermined distance in the circumferential direction, and slots 35 are formed between adjacent teeth 34. The teeth 34 are provided at equal intervals in the circumferential direction.

The stator winding 32 is disposed in each slot 35 so as to be wound around the teeth 34. The stator winding 32 is configured in a state, which uses, e.g., an insulated conductive wire in which a conductor is covered with an insulating layer, in which conductive wires are accommodated in the slots 35 in a plurality of layers in the radial direction. More specifically, the stator winding 32 is configured by a plurality of conductor segments joined together.

Figure 3:
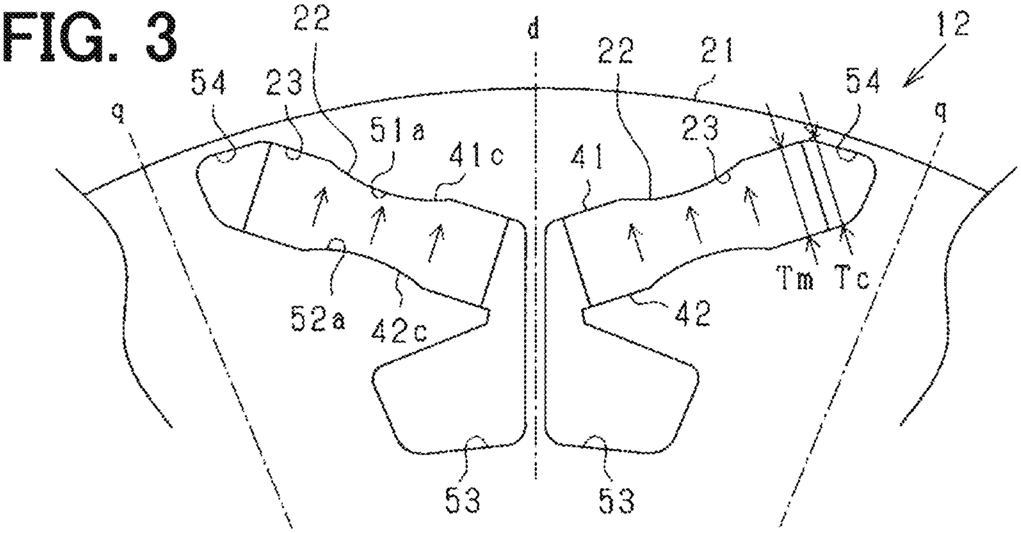
FIG. 3 is a longitudinal cross-sectional view showing a single magnetic pole of the rotor in an enlarged manner.

Next, a magnet accommodation structure in the rotor 12 is explained in detail. FIG. 3 is a longitudinal cross-sectional view showing the configuration of one magnetic pole of the rotor 12 in an enlarged manner, FIG. 4 is a diagram showing a longitudinal cross-sectional shape of the permanent magnet 22, and FIG. 5 is a diagram showing a shape of the accommodation hole 23 of the stator core 21.

Figure 4:
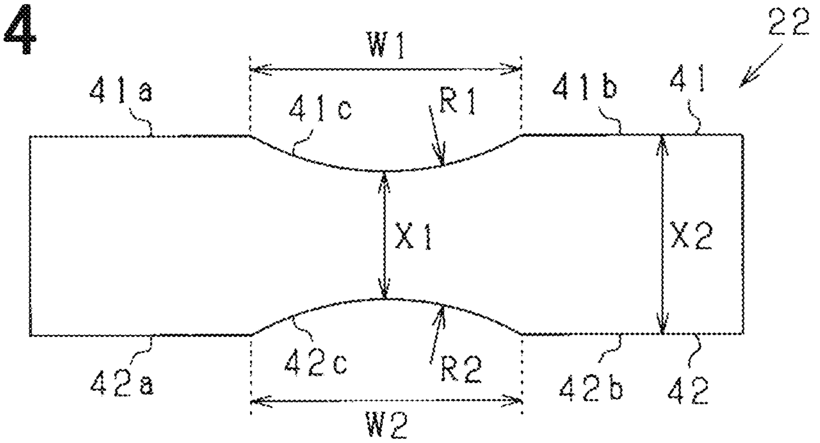
FIG. 4 is a diagram showing a longitudinal cross-sectional shape of a permanent magnet.
Figure 5:
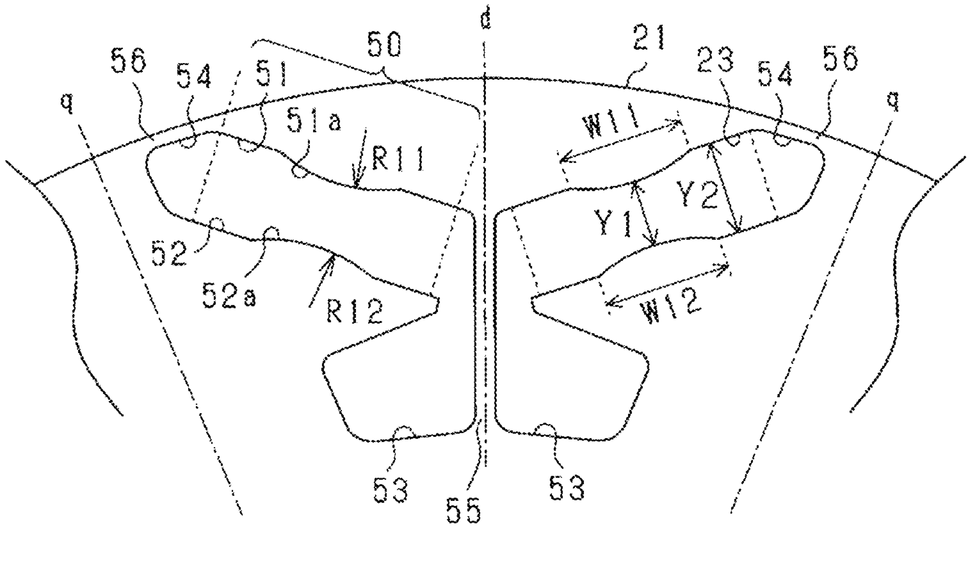
FIG. 5 is a diagram showing a shape of an accommodation hole of the rotor core.

As shown in FIG. 4, the permanent magnet 22 has a substantially rectangular shape in a longitudinal cross-section with a longitudinal direction and a transverse direction and is magnetized such that the transverse direction (vertical direction in the drawing) is the direction of the magnetic field lines inside the magnet. The permanent magnet 22 has a first surface 41 and a second surface 42 that extend in a direction intersecting the magnetization direction and are placed on opposite sides each other. The first surface 41 and the second surface 42 are magnetic flux acting surfaces where the magnetic flux of the magnet enters or exits, and one surface is the north pole, and the other surface is the south pole. In this embodiment, the first surface 41 and the second surface 42 are parallel to each other and orthogonal to the magnetization direction. In addition, in the following description, the transverse direction parallel to the magnetization direction in the longitudinal cross-section of the permanent magnet 22 is also called a thickness direction, and the longitudinal direction orthogonal to the magnetization direction is also called the width direction.

The first surface 41 includes flat portions 41*a* and 41*b* made of flat surfaces on both ends in the width direction (longitudinal direction) and a concave portion 41*c* made of a curved surface in a concaved shape between the flat portions 41*a* and 41*b* on both ends of the magnet. Similarly, the second surface 42 includes flat portions 42*a* and 42*b* made of flat surfaces on both ends in the width direction (longitudinal direction) and a concave portion 42*c* made of a curved surface in a concaved shape between the flat portions 42*a* and 42*b* on both ends of the magnet. An inside of each concave portion 41*c* or 42*c* is formed by an arcuate curved surface smaller than a semicircle.

In this embodiment, the concave portions 41*c* and 42*c* are formed in the same form on the first surface 41 and the second surface 42. That is, the concave portions 41*c* and 42*c* are each formed as a curved surface having the same radius, and the radius "R1" of the concave portion 41*c* and the radius "R2" of the concave portion 42*c* are the same (R1=R2). Furthermore, width distances "W1" and "W2" of the concave portions 41*c* and 42*c* are the same (W1=W2), and center positions of the concave portions 41*c* and 42*c* are the same in the longitudinal direction of the permanent magnet 22.

The permanent magnet 22 shown in FIG. 4 is preferably formed by molding using a molding device, for example. However, it may be formed by cutting into a square plate having a rectangular shape in the longitudinal cross-section. The permanent magnet 22 may be a sintered magnet, a bonded magnet, or the like, and its type is arbitrary.

Further, as shown in FIG. 5, each magnetic pole of the rotor core 21 is formed with accommodation holes 23, which makes a pair with two, on both sides with respect to the d-axis in the circumferential direction, which is a center of the magnetic pole. The pair of accommodation holes 23 are provided in a symmetrical shape with the d-axis as the axis of symmetry between one q-axis and the other q-axis, which are the magnetic pole boundaries. In this embodiment, a total of eight pairs of accommodation holes 23 are provided in the rotor core 21 at equal intervals in the circumferential direction (see FIG. 2).

The accommodation hole 23 has a magnet accommodation portion 50 in which the permanent magnet 22 is accommodated. One permanent magnet 22 is accommodated in each magnet accommodation portion 50. In terms of the pair of accommodation holes 23 on both sides with respect to the d-axis, the magnet accommodation portion 50 of each of the accommodation holes 23 is formed in a substantially V-shape in which an opposing distance increases toward an outside in the radial direction. In terms of a separate distance between the magnet accommodation portion 50 and the stator 13, the magnet accommodation portion 50 is provided such that the separate distance from the stator 13 increases toward the d-axis.

In the rotor core 21, the magnet accommodation portion 50 is formed between a first inner surface 51 and a second inner surface 52 that face each other in the radial direction. The first inner surface 51 and the second inner surface 52 are magnet facing portions that respectively face the first surface 41 and the second surface 42 of the permanent magnet 22 in a state where the permanent magnet 22 is accommodated in the accommodation hole 23.

The first inner surface 51 is formed with a convex portion 51*a* having a curved surface in a convex shape. Further, the second inner surface 52 is formed with a convex portion 52*a* having a curved surface in a convex shape. The convex portions 51*a* and 52*a* of the inner surfaces 51 and 52 are received in the concave portions 41*c* and 42*c* of the permanent magnet 22 and are capable of establishing a concavity and convexity engagement with the concave portions 41*c* and 42*c*. The convex portions 51*a* and 52*a* are each formed as a curved surface having the same radius, and a radius "R11" of the convex portion 51*a* and a radius "R12" of the convex portion 52*a* are the same (R11=R12). Furthermore, width distances W11 and W12 of the convex portions 51*a* and 52*a* are the same (W11=W12), and center positions of the convex portions 51*a* and 52*a* are the same in the longitudinal direction of the permanent magnet 22.

Flux barriers 53 and 54 as magnetic barrier portions are provided on both sides with respect to the magnet accommodation portion 50 in the circumferential direction in the accommodation hole 23, i.e., on a side of the d-axis and a side of the q-axis of the magnet accommodation portion 50, respectively. The flux barriers 53 on sides of the d-axis are provided on both sides with respect to a central bridge 55 extending along the d-axis in straight. The flux barrier 54 on a side of the q-axis is provided on a radial direction inside of an outer bridge 56 formed along the outer peripheral surface of the rotor core 21.

The first inner surface 51 and the second inner surface 52 in the accommodation hole 23 are formed as a continuous flat surface without any steps at boundaries between the magnet accommodation portion 50 and each of the flux barriers 53 and 54. Note that the shape of each of the flux barriers 53 and 54 may be changed, e.g., the flux barrier 53 on a side of the d-axis may have a configuration in which a portion extending in the radial direction inner side than the magnet accommodation portion 50 is not provided.

FIG. 3 shows a state in which the permanent magnet 22 is accommodated in the accommodation hole 23 shown in FIG. 5. In a state where the permanent magnets 22 are accommodated in the accommodation hole 23, the permanent magnets 22 are arranged on both sides of the d-axis in the rotor core 21, and each is placed in an orientation in which one end side of the first surface 41 and the second surface 42 is placed on a side of the d-axis and the other end side is placed on a side of the q-axis. Furthermore, the convex portions 51*a* and 52*a* on a side of the rotor core 21 are received in the concave portions 41*c* and 42*c* of the permanent magnet 22. In this case, a positional displacement of the permanent magnet 22 within the accommodation hole 23 is suppressed by the engagement of the concave portions 41*c* and 42*c* and the convex portions 51*a* and 52*a*. Note that the accommodation hole 23 may be filled with a filler made of a resin material or the like.

As shown in FIG. 4, it is preferable that "X1=Y1" (or X1≈Y1) and "X2=Y2" (or X2≈Y2) are satisfied, where a thickness distance of the concave portions 41*c* and 42*c* of the permanent magnet 22 is "X1", a thickness distance of both ends (flat portions) in the width direction is "X2", and as shown in FIG. 5, a gap distance in the convex portions 51*a* and 52*a* of the accommodation hole 23 is "Y1", and a gap distance on both sides thereof is "Y2".

Since the concave portions 41*c* and 42*c* of the permanent magnet 22 are formed by the curved surfaces in the concaved shapes, even if stress is applied to the concave portions 41$c$ and 42$c$, the stress may be dispersed within the concave portions 41$c$ and 42$c$, it is possible to suppress problems such as damages due to stress concentration. More specifically, even if the concave portions 41$c$ and 42$c$ of the permanent magnet 22 are enlarged by the convex portions 51$a$ and 52$a$ of the rotor core 21 due to dimensional tolerances and the like in an assembling process of the permanent magnet 22 into the accommodation hole 23, damage to the permanent magnet 22 due to stress concentration in the concave portion 41$c$ and 42$c$ is suppressed. Further, even if the rotary electrical machine 10 is subjected to usage environmental stress due to vibration, hot and cold thermal change etc., damage to the permanent magnet 22 due to stress concentration in the concave portions 41$c$ and 42$c$ are suppressed.

Moreover, the thickness in the magnetization direction is thicker at end on a side of the q-axis of the permanent magnet 22 than that at the middle portion in the width direction of the permanent magnet 22. Thereby, it is possible to improve the strength of the anti-demagnetization performance against the reversal magnetic field of the winding applied from a side of the stator 13 to the end portions of the magnet in the rotor 12. In this embodiment, both the first surface 41 and the second surface 42 correspond to the "magnet specific surface", and the first inner surface 51 and the second inner surface 52 both correspond to the "core specific surface".

Outsides of both ends of the permanent magnet 22 in the width direction in the accommodation hole 23 are flux barriers 53 and 54 (gaps), and the flux barriers 53 and 54 are configured in which no positioning step, which comes in contact with the end surface of the permanent magnet 22 in the width direction, is provided. In this case, a height distance "Tc" of a portion where the flux barriers 53 and 54 connect to the magnet accommodation portion 50 is equal to a thickness distance "Tm" of the permanent magnet 22 or larger than the thickness distance "Tm" ($Tc \geq Tm$). This suppresses short circuiting of magnetic flux of the magnet caused by a positioning step that comes into contact with the end surface of the permanent magnet 22 in the width direction.

It is possible to obtain the following excellent effects according to the present embodiment described in detail.

It is an employed structure in which concave portions 41$c$ and 42$c$ are formed by depressing middle portions between both ends in the longitudinal cross-section on the first surface 41 and the second surface 42 extending in a direction intersecting with the magnetization direction inside the magnet in the magnet 22 of the rotor 12 having the magnet-embedded structure. In this case, thicknesses at both ends of the permanent magnet 22 in the magnetization direction are thicker than at the middle portion therebetween. Thereby, it is possible to improve the strength of the anti-demagnetization performance against the reversal magnetic field of the winding applied from a side of the stator 13 to the end portions of the magnet in the rotor 12. In particular, since the concave portions 41$c$ and 42$c$ are formed curved surfaces in concaved shapes, it is possible to suppress stress concentration in the concave portions 41$c$ and 42$c$ of the permanent magnet 22 even if the permanent magnet 22 is subjected to assembling stress or usage environmental stress due to vibrations, hot and cold thermal change etc. As a result, it is possible to improve the anti-demagnetization performance of the permanent magnets 22 and suppress damage to the permanent magnets 22.

It is an employed structure in which the concave portions 41$c$ and 42$c$ are provided on sides of the permanent magnet 22, and the convex portions 51$a$ and 52$a$ that fit into the concave portions 41$c$ and 42$c$ of the permanent magnet 22 are provided on sides of the rotor core 21. In this case, it is possible to suppress the positional displacement of the permanent magnets 22 within the accommodation holes 23 by the engagement between the concave portions 41$c$ and 42$c$ and the convex portions 51$a$ and 52$a$.

In a configuration in which the concave portions 41$c$ and 42$c$ on a side of the permanent magnet 22 and the convex portions 51$a$ and 52$a$ on sides of the rotor core 21 are engageable at a middle portion in the width direction of the permanent magnet 22, since a positional displacement of the permanent magnet 22 is suppressed by this engagement, as a result, no positioning using the ends in the width direction of the permanent magnets 22 is required. In view of this point, it is an employed structure in which no positioning step, which is in contact with the end surface of the permanent magnet 22 in the width direction, is provided in the flux barriers 53 and 54 (gap portions) provided outsides of both ends in the longitudinal cross-section of the permanent magnet 22 in the accommodation hole 23 of the rotor core 21. Thereby, it is possible to suppress short-circuiting of magnetic flux of the magnet caused by a positioning step that comes into contact with the end surface of the permanent magnet 22 in the width direction, and as a result, it is possible to improve torque output.

Next, a modification of the magnet accommodation structure of the rotor 12 is described. Configurations example below is a partial modification of the configuration shown in FIG. 3.

Figure 6A:
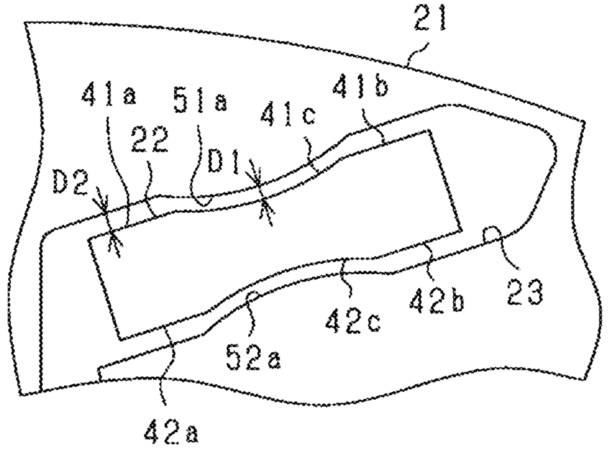
FIG. 6A is a diagram showing a modification of the magnet accommodation structure.

In the configuration shown in FIG. 6A, a gap is provided between the first surface 41 and second surface 42 of the permanent magnet 22 and the first inner surface 51 and second inner surface 52 of the rotor core 21, and the gap distances (distances between the magnet specific surface and the core specific surface) are made different between portions where the concave portions 41$c$ and 42$c$ are provided and portions other than the concave portions 41$c$ and 42$c$ (flat portions). Specifically, "$D1<D2$" is satisfied, where a gap distance at the concave portion 41$c$ on a side of the first surface 41 is "D1" and gap distances at the flat portions 41$a$ and 41$b$ are "D2". Note that a height distance of the convex portion 51$a$ of the first inner surface 51 is larger than the gap distance "D2" at the flat portions 41$a$ and 41$b$. The same may apply to the configuration on a side of the second surface 42.

Here, the same may be explained by using distances X1, X2, Y1, and Y2 shown in FIG. 4 and FIG. 5, "$X1<Y1$" is satisfied at the concave portions 41$c$ and 42$c$ of the permanent magnet 22, and "$X2<Y2$" is satisfied at portions other than the concave portions 41$c$ and 42$c$. Further, "$Y1-X1<Y2-X2$" is satisfied.

In this case, since the gap distances are different at the concave portions 41$c$ and 42$c$ and at other than the concave portions 41$c$ and 42$c$, it is possible to provide wide gap portions partially at portions between the inner surface of the accommodation hole 23 and the permanent magnet 22 accommodated in the accommodation hole 23 of the rotor core 21. In the configuration shown in FIG. 6A, there are relatively wide gap portions at between both ends (flat portions) of the permanent magnet 22 in the width direction and the inner surface of the accommodation hole 23. Thereby, it is possible to reduce insertion load due to contact friction at an inserting process of the magnet and suppress damage of the magnet due to contact.

In particular, in a configuration in which the gap distance at the concave portions 41c and 42c on the permanent magnet 22 is made smaller than the gap distance at portions other than the concave portions 41c and 42c (configuration where "D1<D2"), since the gap distances (D1) at the concave portions 41c and 42c (D1) are made relatively small, it is possible to perform a suppression of the positional displacement of the permanent magnet 22 appropriately by using the concavity and convexity engagement. In addition, since the gap distance (D2) in portions other than the concave portions 41c and 42c are relatively large, it is possible to suppress damage to the magnet due to both ends of the magnet coming in contact with the inner surface of the accommodation hole 23, and it is possible to improve an effect of suppressing demagnetization of the magnet by reducing magnetic field of the winding applied to the ends of the magnet.

Note that the gap distance (D1) at the concave portions 41c and 42c may be made larger than the gap distance (D2) at portions other than the concave portions 41c and 42c. Further, the gap distance (D1) at the concave portions 41c and 42c may be the same as the gap distance (D2) at portions other than the concave portions 41c and 42c. It may be modified to a configuration in which the gap distances (D1, D2) on a side of the first surface 41 and the gap distances on a side of the second surface 42 are different.

Figure 6B:
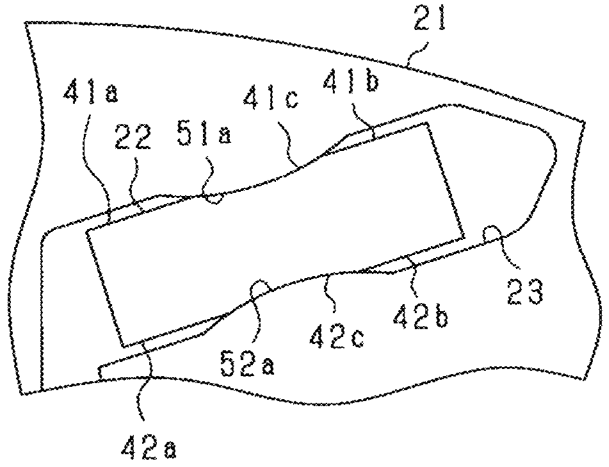
FIG. 6B is a diagram showing a modification of the magnet accommodation structure.

In the configuration shown in FIG. 6B, either one of portions of the concave portions 41c and 42c and other than the concave portions 41c and 42c (flat portion) on the first surface 41 and second surface 42 of the permanent magnet 22 is in contact with the first inner surface 51 and the second inner surface 52 of the rotor core 21. In particular, in FIG. 6B, the concave portions 41c and 42c are in contact with the convex portions 51a and 52a of the first inner surface 51 and the second inner surface 52.

In this case, it makes possible to appropriately perform a fixing of the permanent magnet 22 within the accommodation hole 23 by partially providing a contact portion with the inner surface of the accommodation hole 23 on the first surface 41 and the second surface 42 of the permanent magnet 22, and it is possible to reduce load in an inserting process of the magnet and it is possible to perform suppression of damage to the magnet due to excessive press-fitting stress by reducing a contact surface area in an inserting process of the permanent magnet 22 into the accommodation hole 23.

Moreover, since the concave portions 41c and 42c are in contact with the first inner surface 51 and the second inner surface 52 among the portions at the concave portions 41c and 42c and other than the concave portions 41c and 42c (flat parts), it is possible to perform a suppression of positional displacement of the permanent magnet 22 appropriately by using the concavity and convexity engagement at the concave portions 41c and 42c. Furthermore, since gaps between the first surface 41 and the second surface 42 of the permanent magnet 22 and the first inner surface 51 and the second inner surface 52 of the rotor core 21 are made relatively large in the flat portions 41a, 41b, 42a, and 42b, which are the ends in the width direction of the permanent magnet 22, it is possible to suppress damage to the magnet due to both ends of the magnet coming in contact with the inner surface of the accommodation hole 23, and to improve an effect of suppressing demagnetization of the magnet by reducing magnetic field of the winding applied to the ends of the magnet.

Note that the concave portions 41c and 42c may come in contact with the convex portions 51a and 52a over the entire width direction or may come in contact with the convex portions 51a and 52a partially in the width direction. Furthermore, the concave portions 41c and 42c may come in contact with the convex portions 51a and 52a only at one of the concave portion 41c on a side of the first surface 41 and the concave portion 42c on a side of the second surface 42.

Figure 6C:
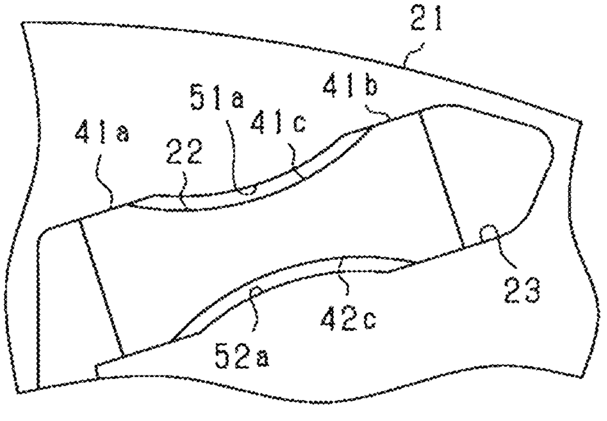
FIG. 6C is a diagram showing a modification of the magnet accommodation structure.

As shown in FIG. 6C, portions of the permanent magnet 22 other than the concave portions 41c and 42c (i.e., the flat portions 41a, 41b, 42a, and 42b) may be configured to come in contact with the first inner surface 51 and the second inner surface 52.

Figure 7A:
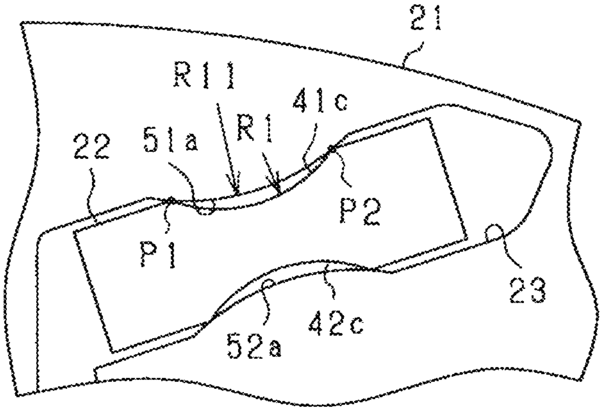
FIG. 7A is a diagram showing a modification of the magnet accommodation structure.

As shown in FIG. 7A, the relationship between the radius "R1" of the concave portion 41c and the radius "R11" of the convex portion 51a in the accommodation hole 23 on a side of the first surface 41 of the permanent magnet 22 may be changed to "R1<R11". In this case, it is possible to place the permanent magnet 22 so that both the first surface 41 and the second surface 42 of the permanent magnet 22 come in contact with the first inner surface 51 and the second inner surface 52 of the rotor core 21 at two points (See P1 and P2 in FIG. 7A), respectively. Thereby, it is possible to reduce a contact area of the permanent magnet 22 with the inner surface on a side of the rotor core 21 and suppress the permanent magnet 22 from unintentionally tilting within the accommodation hole 23. The same may apply to the configuration on a side of the second surface 42. This configuration corresponds to a configuration in which "a curvature radius "A" of the concave portion is smaller than a curvature radius "B" of the convex portion (A<B)".

Figure 7B:
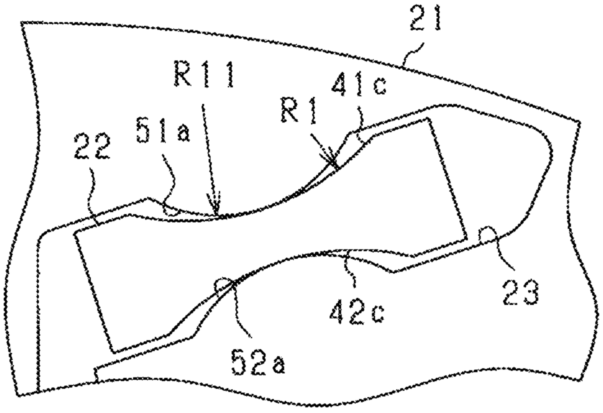
FIG. 7B is a diagram showing a modification of the magnet accommodation structure.

As shown in FIG. 7B, the relationship between the radius "R1" of the concave portion 41c and the radius "R11" of the convex portion 51a in the accommodation hole 23 on a side of the first surface 41 of the permanent magnet 22 may be changed to "R1>R11". In this case, it is possible to improve advantage for suppressing damage of the permanent magnet 22, since enlarging of the concave portions 41c and 42c of the permanent magnet 22 by the convex portions 51a and 52b of the rotor core 21 is suppressed even if the rotor core 21 expands or the magnet 22 contracts in a width direction of the magnet due to hot and cold thermal stress. This configuration corresponds to a configuration in which "a curvature radius "A" of the concave portion is larger than a curvature radius "B" of the convex portion (A>B).

Figure 8A:
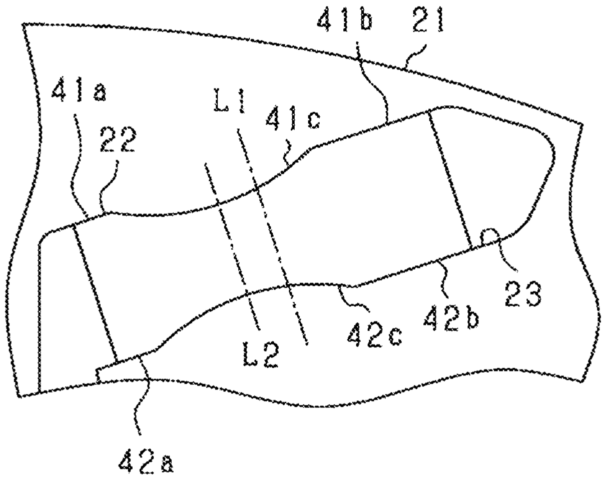
FIG. 8A is a diagram showing a modification of the magnet accommodation structure.

As shown in FIG. 8A, the permanent magnet 22 may have a configuration in which positions of the concave portions 41c and 42c in the width direction are shifted toward a side of the d-axis. Specifically, in a case that the center position of the permanent magnet 22 in the width direction is "L1", and the center position of the concave portions 41c and 42c in the width direction is "L2", the center position "L2" of the concave portions 41c and 42c is shifted closer to the d-axis than the center position "L1" of the permanent magnet 22. As a result, in the first surface 41 and second surface 42 of the permanent magnet 22, the flat portions 41b and 42b on a side of the q-axis are wider than the flat portions 41a and 42a on a side of the d-axis.

In a configuration in which the permanent magnets 22 are provided on both sides of the d-axis in the rotor core 21, one end side of the first surface 41 and second surface 42 of the permanent magnet 22 is on a side of the d-axis and the other end is on a side of the q-axis on a view in a longitudinal cross-section. In this case, the end of the permanent magnet 22 on a side of the q-axis is closer to the stator 13 than the end on a side of the d-axis, a risk of demagnetization may be increased. In this respect, it is possible to suitably suppress demagnetization due to magnetic field of the winding from the stator 13, since a magnet thickness (magnet amount) at an end on a side of the q-axis of the permanent magnet 22 is kept proper value by making a width of the flat portions 41*b* and 42*b* (second flat portion) on a side of the q-axis wider than that of the flat portions 41*a* and 42*a* (first flat portion) on a side of the d-axis in the first surface 41 and second surface 42 of the permanent magnet 22.

Figure 8B:
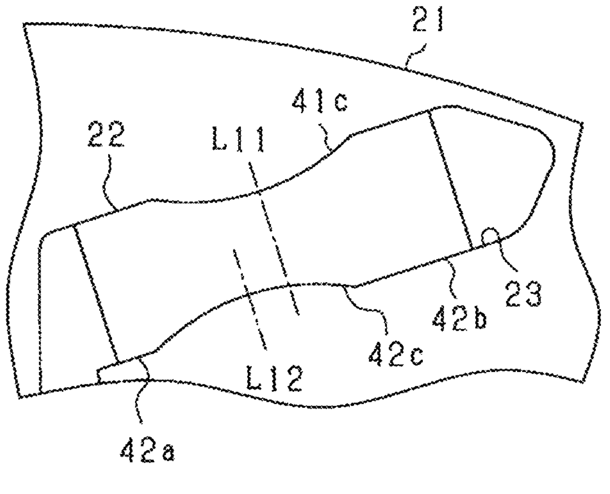
FIG. 8B is a diagram showing a modification of the magnet accommodation structure.

As shown in FIG. 8B, it may be modified in a configuration in which a center position "L11" in the width direction of the concave portion 41*c* on the first surface 41 and a center position "L12" in the width direction of the concave portion 42*c* on the second surface 42 in the permanent magnet 22 are shifted each other in the width direction. In FIG. 8B, the center position "L11" of the concave portion 41*c* on the first surface 41 is the same as the center position in the width direction of the permanent magnet 22, while the center position "L12" of the concave portion 42*c* on the second surface 42 is the center set closer to the d-axis than the position "L11" (magnet center position). In this configuration, the flat portion 42*b* on a side of the q-axis is wider than the flat portion 42*a* on a side of the d-axis of the second surface 42 of the permanent magnet 22. Thereby, a thickness of the magnet (magnet amount) at an end on a side of the q-axis of the permanent magnet 22 is ensured, and it is possible to suitably suppress demagnetization due to magnetic field of the winding from the stator 13.

Figure 9A:
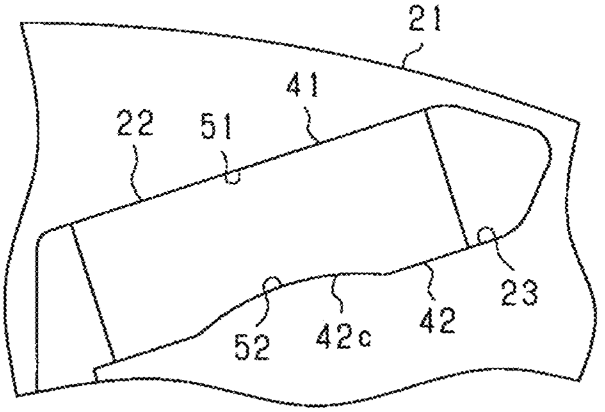
FIG. 9A is a diagram showing a modification of the magnet accommodation structure.

Only one of the first surface 41 and the second surface 42 in the permanent magnet 22 may have a concave portion. In FIG. 9A, a concave portion 42*c* is provided only on the second surface 42 among the first surface 41 and the second surface 42. In this case, the second surface 42 of the permanent magnet 22 corresponds to the "magnet specific surface", and the second inner surface 52 of the accommodation hole 23 corresponds to the "core specific surface".

Figure 9B:
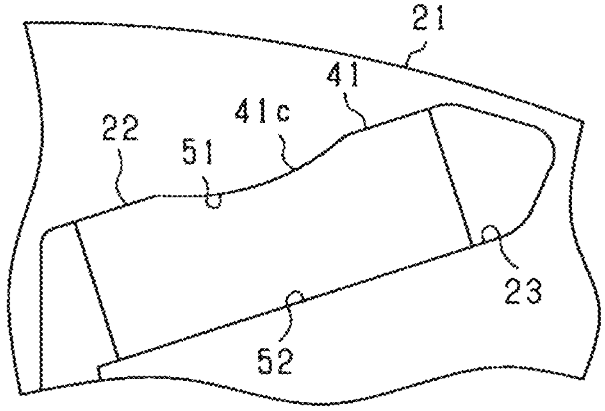
FIG. 9B is a diagram showing a modification of the magnet accommodation structure.

In FIG. 9B, a concave portion 41*c* is provided only on the first surface 41 among the first surface 41 and the second surface 42. In this case, the first surface 41 of the permanent magnet 22 corresponds to the "magnet specific surface", and the first inner surface 51 of the accommodation hole 23 corresponds to the "core specific surface".

Figure 9C:
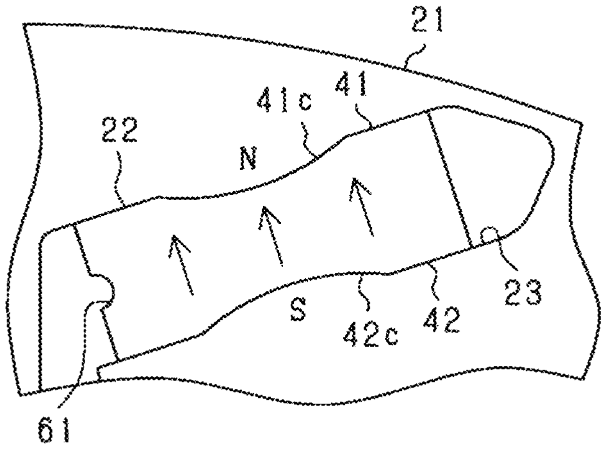
FIG. 9C is a diagram showing a modification of the magnet accommodation structure.

Moreover, FIG. 9C shows a configuration in which a notched concave portion 61 is provided on one end surface among both ends in the width direction of the permanent magnet 22. The notched concave portion 61 is provided according to the N and S poles of the permanent magnet 22 and works as an identification mark for identifying an assembly direction. This notched concave portion 61 makes it possible to suppress errors in the direction in which the permanent magnet 22 is assembled. It is also possible to provide a protruding portion instead of the notched concave portion 61 as the identification mark.

Figure 10A:
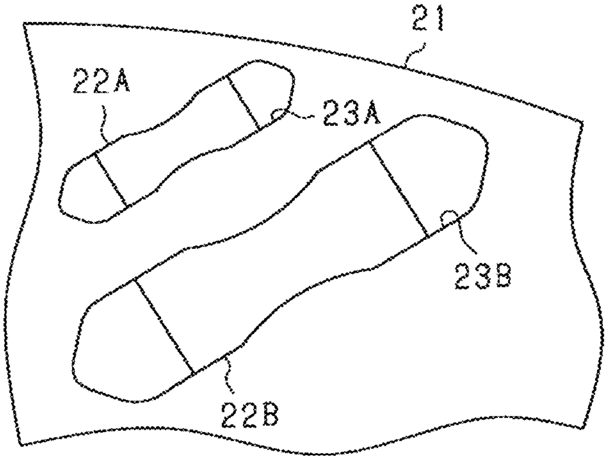
FIG. 10A is a diagram showing a modification of the magnet accommodation structure.
Figure 10B:
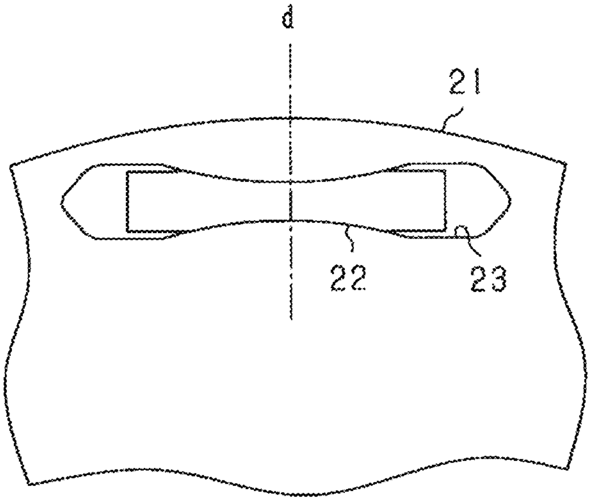
FIG. 10B is a diagram showing a modification of the magnet accommodation structure.
Figure 10C:
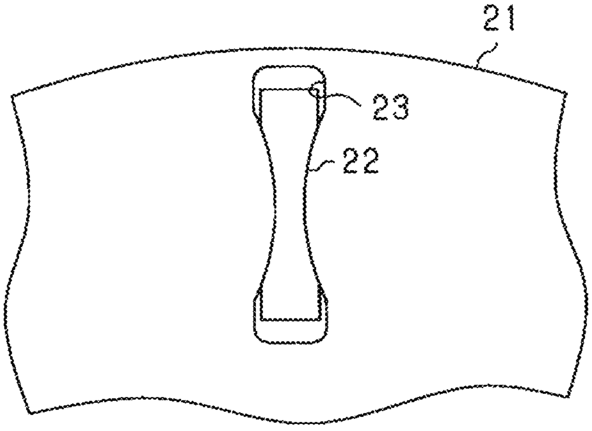
FIG. 10C is a diagram showing a modification of the magnet accommodation structure.

The arrangement of the magnets in the rotor core 21 may be modified as shown in FIG. 10A, FIG. 10B and FIG. 10C. In the configuration of FIG. 10A, in the rotor core 21, the accommodation holes 23A and 23B are provided in multiple rows in the radial direction, and permanent magnets 22A, 22B are assembled in the accommodation holes 23A and 23B, respectively.

Further, in a configuration of FIG. 10B, the accommodation hole 23 in a straight shape is provided in the rotor core 21 in a direction extending perpendicular to the d-axis, and the permanent magnet 22 is assembled in the accommodation hole 23. Further, in the configuration of FIG. 10C, the accommodation hole 23 in a straight shape is provided in the rotor core 21 in a direction extending in the radial direction, and the permanent magnet 22 is assembled in the accommodation hole 23.

OTHER EMBODIMENTS

It is also possible to modify the above described embodiment as follows, for example.

The concave portions 41*c* and 42*c* in the permanent magnet 22 may be formed by a plurality of curved surfaces each having a different curvature radius. For example, it may be considered that a configuration in which the concave portions 41*c* and 42*c* is formed with a curved surface having a relatively small curvature radius on both sides in the width direction and a curved surface having a relatively large curvature radius on a center in the width direction.

The permanent magnet 22 is not limited to those whose magnetization direction crosses perpendicularly to the width direction of the permanent magnet 22, but may be those whose magnetization direction crosses diagonally to the width direction of the permanent magnet 22, and those whose magnetization direction is arcuate.

The rotary electric machine 10 may have an outer rotor structure instead of the inner rotor structure.

What is claimed is:

1. A rotor having a magnet-embedded structure, the rotor comprising:
- a rotor core; and
- a magnet held in the rotor core, wherein
- the magnet is accommodated in an accommodation hole provided in the rotor core, and wherein
- the magnet has a first surface and a second surface which extend in a direction intersecting with a magnetization direction, which is a direction of magnetic field lines inside the magnet, and oppose each other, and wherein
- both the first surface and the second surface are provided with flat portions made of flat surfaces on both ends in a longitudinal direction a concave portion, which is provided with a curved surface in a concaved shape at a middle portion between the flat portions on both ends in a longitudinal cross-section.

2. The rotor according to claim 1, wherein
- the magnet has a magnet specific surface which is a surface among the first surface and the second surface where the concave portion is formed, the rotor core has a core specific surface which is an inner surface facing the magnet specific surface among an inner surface defining the accommodation hole, and the core specific surface has a convex portion which is received in the concave portion on the magnet specific surface.

3. The rotor according to claim 2, wherein
- distances between the magnet specific surface and the core specific surface are formed so that the distance at a portion where the concave portion is provided on the magnet specific surface is different from the distance at a portion where the concave portion is not provided.

4. The rotor according to claim 3, wherein
- distances between the magnet specific surface and the core specific surface are formed so that the distance at a portion where the concave portion is provided on the magnet specific surface is smaller than the distance at a portion where the concave portion is not provided.

5. The rotor according to claim 2, wherein
- one of the portion where the concave portion is provided on the magnet specific surface and the portion where the concave portion is not provided in contact with the core specific surface.

6. The rotor according to claim 2, wherein
- the portion where the concave portion is provided on the magnet specific surface is in contact with the core specific surface among the portion where the concave portion is provided on the magnet specific surface and the portion where the concave portion is not provided.

7. The rotor according to claim 2, wherein a relationship between a curvature radius "A" of the concave portion on the magnet specific surface and a curvature radius "B" of the convex portion on the core specific surface is "A<B".

8. The rotor according to claim 2, wherein a relationship between a curvature radius "A" of the concave portion on the magnet specific surface and a curvature radius "B" of the convex portion on the core specific surface is "A>B".

9. The rotor according to claim 2, wherein the magnet includes pieces arranged on both sides of a d-axis, which is a magnetic pole center in the rotor core, respectively, and is placed in an orientation in which one end side of the first surface and the second surface is placed on a side of the d-axis and the other end side is placed on a side of a q-axis in a view of a longitudinal cross-section, and wherein the magnet specific surface of the magnet has a first flat portion on a side of the d-axis and a second flat portion on a side of the q-axis, among both sides with respect to the concave portion, and wherein the second flat portion is wider than the first flat portion in a width direction in which the concave portion and both flat portions are arranged.

10. The rotor according to claim 2, wherein the accommodation hole of the rotor core includes gaps which are provided on outside of both ends of the magnet in a longitudinal cross-section, and wherein the gaps are provided with no positioning step which comes in contact with an end surface between the first surface and the second surface of the magnet.

11. The rotor according to claim 1, wherein the magnet is one of a plurality of magnets, and wherein the accommodation hole is one of a plurality of accommodation holes provided in the rotor core, and wherein the plurality of magnets are accommodated in the accommodation holes, respectively, and wherein the plurality of magnets have both the first surface and the second surface, which are provided with the flat portions and the concave portion, respectively, and wherein each one of the plurality of accommodation holes has a magnet accommodation portion which is formed between a first inner surface facing the first surface of accommodated one of the plurality of magnets and a second inner surface facing the second surface of accommodated one of the plurality of magnets, and wherein the first inner surface is formed with a convex portion having a curved surface in a convex shape and being received in the concave portion of accommodated one of the plurality of magnets, and wherein the second inner surface is formed with a convex portion having a curved surface in a convex shape and being received in the concave portion of accommodated one of the plurality of magnets.

12. The rotor according to claim 11, wherein the rotor is an IPM rotor having a magnet-embedded structure.

13. The rotor according to claim 12, wherein the concave portion of the first surface and the concave portion of the second surface have the same radius.

14. The rotor according to claim 13, wherein the concave portion of the first surface and the concave portion of the second surface have the same distance in a longitudinal direction.

* * * * *